United States Patent
Guthrie et al.

(10) Patent No.: US 8,749,656 B2
(45) Date of Patent: Jun. 10, 2014

(54) APPARATUS AND METHOD FOR IMAGE DECIMATION FOR IMAGE SENSORS

(75) Inventors: Edward Guthrie, Boston, MA (US); Masatoshi Sase, Yokohama (JP); Steven Decker, Sandown, NH (US); Katsu Nakamura, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 339 days.

(21) Appl. No.: 13/049,790

(22) Filed: Mar. 16, 2011

(65) Prior Publication Data
US 2012/0236187 A1    Sep. 20, 2012

(51) Int. Cl.
| H04N 5/228 | (2006.01) |
| H04N 3/14  | (2006.01) |
| H04N 9/083 | (2006.01) |
| H04N 5/335 | (2011.01) |
| H04N 9/04  | (2006.01) |

(52) U.S. Cl.
USPC .......................... 348/222.1; 348/272; 348/273

(58) Field of Classification Search
USPC .................................. 348/272–283, 294–310
See application file for complete search history.

(56) References Cited

U.S. PATENT DOCUMENTS

| 7,852,394 B2 * | 12/2010 | Murakami ..................... 348/317 |
| 7,880,777 B2 * | 2/2011 | Anderson ..................... 348/241 |
| 8,040,558 B2 * | 10/2011 | Dosluoglu ..................... 358/1.9 |
| 8,144,222 B2 * | 3/2012 | Kanemitsu et al. ........... 348/273 |
| 8,363,123 B2 * | 1/2013 | Inaba et al. ................ 348/222.1 |
| 2006/0132634 A1 | 6/2006 | Kudoh |
| 2006/0279632 A1 * | 12/2006 | Anderson ..................... 348/164 |
| 2008/0012970 A1 * | 1/2008 | Murakami ..................... 348/272 |
| 2010/0231765 A1 * | 9/2010 | Kefeder ........................ 348/273 |
| 2010/0231773 A1 * | 9/2010 | Fujimura et al. .............. 348/311 |

FOREIGN PATENT DOCUMENTS

| EP | 2 166 750 | 3/2010 |
| FR | 2 867 936 | 9/2005 |

OTHER PUBLICATIONS

International Search Report of the International Searching Authority in counterpart International Appl. No. PCT/US2012/028927, dated Jul. 19, 2012, 4 pages.
Written Opinion of the International Searching Authority in counterpart International Appl. No. PCT/US2012/028927, dated Jul. 19, 2012, 5 pages.

* cited by examiner

*Primary Examiner* — Timothy J Henn
*Assistant Examiner* — Pritham Prabhakher
(74) *Attorney, Agent, or Firm* — Knobbe, Martens, Olson & Bear, LLP

(57) ABSTRACT

Previously available analog domain decimation techniques are limited to simple equally-weighted averaging of photosite outputs. Decimation of a Bayer pattern image by an even-factor, such as by two or six, using simple equally-weighted averaging of photosite outputs in the analog domain results in effective sampling locations that are unevenly spaced apart. Standard interpolation of the unevenly spaced effective sampling locations generates image artifacts that reduce the quality of the reconstructed image in the smaller format because standard interpolation methods assume that the effective sampling locations are evenly spaced. Implementations of systems, methods and apparatus disclosed herein aim to produce substantially evenly spaced effective sampling locations in the analog domain. More specifically, in some implementations, the unequally-weighted-average even-factor decimation methods disclosed herein produce substantially more evenly spaced effective sampling locations as compared to the equally-weighted-average even-factor decimation processes previously used in the analog domain.

32 Claims, 15 Drawing Sheets

APPARATUS AND METHOD FOR IMAGE DECIMATION FOR IMAGE SENSORS

BACKGROUND

1. Field

Aspects of the invention relate to image processing, and more particularly, to systems, methods and apparatus configured to decimate the output of an image sensor that uses a color filter to discriminate colors.

2. Description of the Related Technology

An image sensor system converts an optical image into a set electrical values representative of the optical image. The electrical values are referred to as electronic image data and can be stored in various file formats. The conversion of an optical image into electronic image data is often accomplished in two broadly defined stages. First, light associated with an optical image is converted into a set of raw analog electrical values by an image sensor. Second, the raw analog electrical values produced by the image sensor are converted into digital values by an analog-to-digital converter to enable digital processing and reconstruction of the electronic image data.

An image sensor typically includes a two-dimensional photosite array, which is also referred to as a pixel sensor array. Each photosite or pixel sensor is used to convert the light associated with a portion of an optical image into a corresponding raw analog electrical value. To that end, each photosite includes at least one photoelectric device that converts incident light into a corresponding raw analog electrical value. Charge-coupled devices (CCD) and complementary metal oxide semiconductor (CMOS) photo sensors are commonly employed in the photosites of image sensors included in consumer products such as digital cameras.

To facilitate color image sensing, an image sensor may include a color filter array that is arranged in combination with a photosite array. In one implementation, a color filter array, such as a Bayer filter, is utilized to selectively pass one of red, green, or blue light to each photosite in accordance with a particular filter pattern. The combination of the color filter array and the photosite array form an array of three interlaced grids, each of which is sensitive to one of red, green, or blue light. In operation, a single color is sampled at each photosite because each photosite is sensitive to one of red, green, or blue light. Employing this configuration a single photosite cannot fully determine a spectrum of color alone because each photosite is individually configured to capture only one of three colors. To obtain a full-color image a demosaicing algorithm is typically used to interpolate a set of complete red, green, and blue values for each point of an image. In other words, a color image is estimated by interpolating the three interlaced grids.

SUMMARY

Various embodiments of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how various features are employed to configure image sensing systems, methods and apparatus that may be less computationally expensive, may have faster readout speeds, and may have relatively lower system power consumption for a particular implementation.

One aspect of the disclosure is an apparatus configured to decimate the photosite outputs of a color image sensor in the analog domain. In some implementations, the apparatus includes a plurality of column connect switches arranged to selectively connect photosites of at least one row of an image sensor to a respective plurality of column lines; a respective plurality of electrical storage elements selectively connectable to each of the respective plurality of columns lines, wherein each of the plurality of electrical storage elements is connectable to at least one column line via a respective sampling switch; and a respective plurality of mixing switches arranged to selectively connect respective pluralities of electrical storage elements, wherein the column connect switches, the sampling switches and mixing switches are operable to effectuate unequally-weighted-average even-factor decimation of photosite outputs in the analog domain by selective combination of electrical values read and stored by the respective pluralities of electrical storage elements.

In some implementations, the apparatus also includes a controller configured to provide control signals to the column connect switches, the sampling switches and mixing switches to effectuate even-factor decimation of photosite outputs in the analog domain. In some implementations, the controller is further configured to provide at least one column select signal and row select signal. In some implementations, the controller is configured to effectuate unequally-weighted-average 2×2 decimation by providing control signals to the column connect switches, the sampling switches and mixing switches.

In some implementations, the apparatus also includes an image sensor having a photosite array and a color filter. In some implementations, the color filter comprises a Bayer filter. In some implementations, the color filter at least in part contributes to the generation of photosite outputs that are interpretable by a demosaicing algorithm.

In some implementations, the electrical values include photosite output voltages. In some implementations, the selective combination of electrical values includes determining an unequally-weighted-average of a plurality of photosite output voltages. In some implementations, the respective weights for determining the unequally-weighted-average correspond to values attainable by linear interpolation. In some implementations, the respective weights for determining the unequally-weighted-average correspond to values attainable by second order interpolation. In some implementations, the respective weights for determining the unequally-weighted-average correspond to values attainable by $n^{th}$ order interpolation. In some implementations, the electrical storage elements comprises capacitive elements.

In some implementations, the plurality of column lines includes at least one column line for each photosite in a row. In some implementations, the unequally-weighted-average even-factor decimation of photosite outputs produces effective sampling locations that are substantially evenly spaced.

Another aspect of the disclosure is a method of even-factor decimation of photosite outputs in the analog domain. In some implementations, the method includes storing photosite outputs on two or more pluralities of electrical storage elements; and selectively combining electrical values read and stored on the respective pluralities of electrical storage elements to generate one or more effective sampling locations by unequally-weighted-average even-factor decimation of the photosite outputs in the analog domain.

In some implementations, the method also includes selecting at least one row and at least two columns of photosite outputs. In some implementations, the method also includes selecting at least one column and at least two rows of photosite outputs. In some implementations, storing photosite outputs on two or more pluralities of electrical storage elements comprises selectively sampling photosite outputs from an image sensor including a color filter. In some implementations, the color filter is a Bayer filter. In some implementations, the color filter at least in part contributes to the generation of photosite outputs that are interpretable by a demosaicing algorithm.

In some implementations, the electrical values include photosite output voltages. In some implementations, the selective combination of electrical values includes determining an unequally-weighted-average of a plurality of photosite output voltages. In some implementations, the respective weights for determining the unequally-weighted-average correspond to values attainable by linear interpolation. In some implementations, the respective weights for determining the unequally-weighted-average correspond to values attainable by second order interpolation. In some implementations, the respective weights for determining the unequally-weighted-average correspond to values attainable by $n^{th}$ order interpolation.

In some implementations, the electrical storage elements comprises capacitive elements. In some implementations, the plurality of column lines includes at least one column line for each photosite in a row. In some implementations, the weighted-average even-factor decimation of photosite outputs produces effective sampling location that are substantially evenly spaced.

In some implementations, the method also includes generating control signals to effectuate weighted-average even-factor decimation of the photosite outputs. In some implementations, the method also includes effectuating weighted-average 2×2 decimation by providing control signals to a combination of the column connect switches, the sampling switches and mixing switches that are selectively connectable to the pluralities of electrical storage elements. In some implementations, the method also includes generating at least one column select signal and at least one row select signal.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain aspects of example implementations described in this disclosure and are therefore not necessarily to be considered limiting of its scope, for the description may admit to other equally effective aspects for other implementations.

Figure 1:
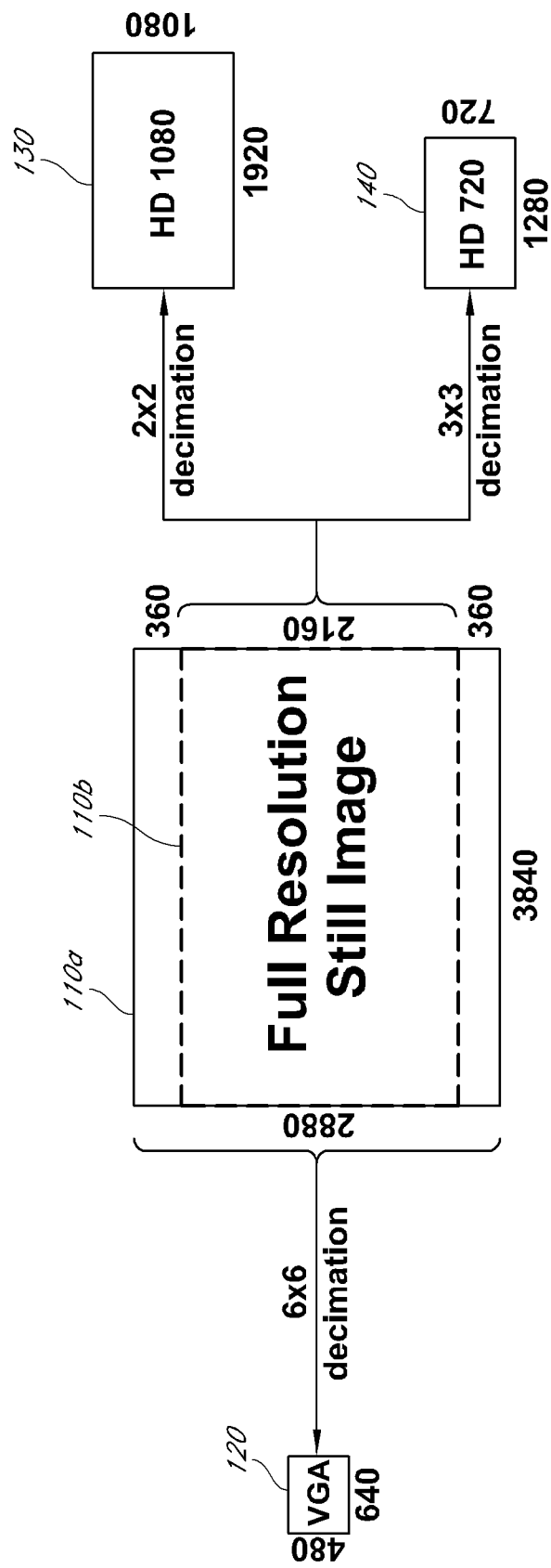
FIG. 1 is a diagram illustrating the relationship between different image sensor resolutions and various image display formats.

In accordance with common practice the various features illustrated in the drawings may not be drawn to scale. Accordingly, the dimensions of the various features may be arbitrarily expanded, reduced and or simplified for clarity. In addition, some of the drawings may not depict all of the components of a given system, method or device. Finally, like reference indicia may be used to denote like features throughout the specification and figures.

DETAILED DESCRIPTION

The various embodiments of systems, methods, and devices described herein each have several aspects, no single one of which is solely responsible for the desirable attributes described. Without limiting the scope of the claims, the more prominent features of various implementations are described below. After considering the following, one skilled in the art will understand how the features of the various embodiments provide advantages over previously available schemes for decimating the output of an image sensor.

It is often desirable to configure an image sensor system to be able to produce electronic image data in a number of formats. To that end, one way to implement such an image sensor system is to utilize a photosite array that is large (in resolution) enough to produce a full resolution image of raw analog electrical values, which can be conveniently scaled into a number of smaller formats. It will be understood that the photodiode pitch can vary so that a photosite array of a particular resolution can have a number of different physical sizes. Consequently, there lies a challenge in how to decimate a sensed image so that the sensed image can be displayed in a smaller format.

FIG. 1 is a diagram illustrating the relationship between a typical full resolution image output of a photosite array and various smaller image-display formats. A photosite array can be utilized to produce a full resolution still image in at least two useful sizes. As illustrated in FIG. 1, a first full resolution still image 110a may be produced by a first photosite array that is 2880×3840, and a second full resolution still image 110b may be produced by a second photosite array that is 2160×3840. That is, in one implementation, the set of raw analog electrical values comprising the first full resolution still image 110a are produced by a first photosite array that at least includes a 2880×3840 array of photoelectric devices. Similarly, in one implementation, the set of raw analog electrical values comprising the second full resolution still image 110b are produced by a second photosite array that at least includes a 2160×3840 array of photoelectric devices.

In another implementation, the second full resolution still image 110b can be produced by a smaller sub-array of photosites included in a photosite array sized to also produce the first full resolution still image 110a. For example, as illustrated in FIG. 1, the second full resolution still image 110b can be produced from the first full resolution still image 110a by cropping away 360 rows of photosite outputs from the top of and 360 rows of photosite outputs from the bottom of the first full resolution still image 110a. Those skilled in the art will appreciate from the present disclosure that the terms top and bottom are merely used herein to indicate one of many possible orientations of the image data, and do not necessarily limit the scope of the appended claims. Moreover, those skilled in the art will also appreciate from the present disclosure that the first full resolution still image 110a may be cropped in a number of ways to produce the second full resolution still image 110b, and the example described above is merely provided to illustrate one of many possible schemes for deriving the second full resolution still image 110b from the first full resolution still image 110a.

To derive an image in a smaller image-display format, a full resolution still image can be decimated by color on a sub-array basis. For example, the photosite outputs from the first full resolution still image 110a can be grouped into sub-arrays by color, and the photosite outputs within each color-specific sub-array can be combined to produce a corresponding effective pixel or sampling location for that particular color. The result is a set of effective sampling locations for each color. The set of sampling locations for each color form a data set for the image in the smaller image-display format.

With further reference to FIG. 1, a video graphics array (VGA) image 120 typically includes a 640×480 array of pixels. The VGA image 120 may be derived by decimating the first full resolution image 110a using a 6×6 decimation process for each color. A typical 6×6 decimation process generates a single effective sampling location from a respective 6×6 sub-array of photosite outputs of a particular color. For example, a single effective sampling location for the color red can be produced by combining the outputs of red-sensitive photosites in a two-dimensional sub-array that is defined by six red-sensitive photosites on each side.

With continued reference to FIG. 1, a first high definition (HD) image 130 includes a 1920×1080 array of pixels, and a second HD image 140 includes a 1280×720 array of pixels. The first HD image 130 may be derived by decimating the second full resolution image 110b using a 2×2 decimation process for each color. A typical 2×2 decimation process generates a single effective sampling location from a respective 2×2 sub-array of photosite outputs of a particular color. For example, a single effective sampling location for the color green can be produced by combining the outputs of green-sensitive photosites in a two-dimensional sub-array that is defined by two green-sensitive photosites on each side. Similarly, the second HD image 140 may be derived by decimating the second full resolution image 110b using a 3×3 decimation process for each color. A typical 3×3 decimation process generates a single effective sampling location from a respective 3×3 sub-array of photosite outputs of a particular color. For example, a single effective sampling location for the color blue can be produced by combining the outputs of blue-sensitive photosites in a two-dimensional sub-array that is defined by three blue-sensitive photosites on each side.

Figure 2:
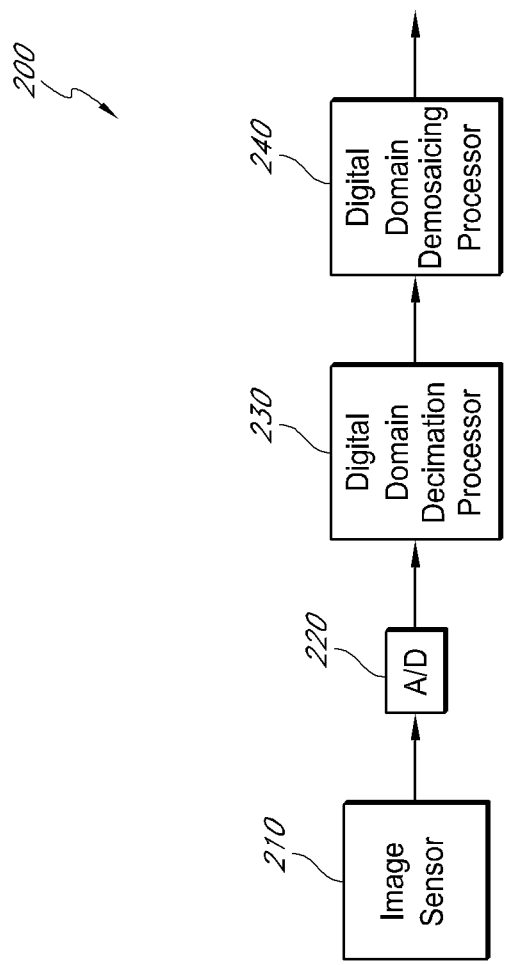
FIG. 2 is a simplified block diagram of an image sensor system.

FIG. 2 is a simplified block diagram of an image sensor system 200. The system 200 includes an image sensor 210, an analog-to-digital converter (ADC) 220, a digital domain decimation processor and a digital domain demosaicing processor 240. The image sensor 210 includes a two-dimensional array of photosites or pixel sensors (not individually shown). Each photosite is used to convert the light associated with a portion of an optical image into a corresponding raw analog electrical value. A full resolution still image includes a data set including the raw analog electrical values.

In operation, the full resolution still image produced by the image sensor 210 is provided to the ADC 220. The ADC converts the raw analog electrical values into corresponding digital values to enable digital processing, such as decimation, compression, storage, etc. Accordingly, the digital values produced by the ADC 220 are provided to the digital domain decimation processor 230, which reduces the full resolution digital image into a smaller format. The decimated image is then further processed by the digital domain demosaicing processor 240.

Figure 3A:
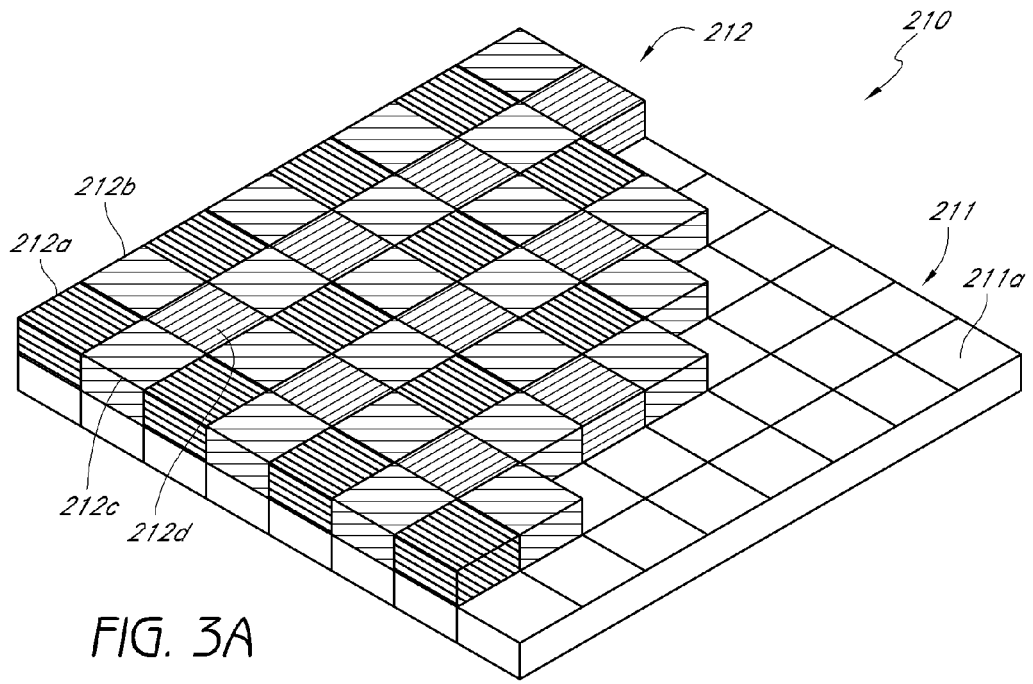
FIG. 3A is a simplified perspective cut-away view of an image sensor including a photosite array and a Bayer color filter.
Figure 3B:
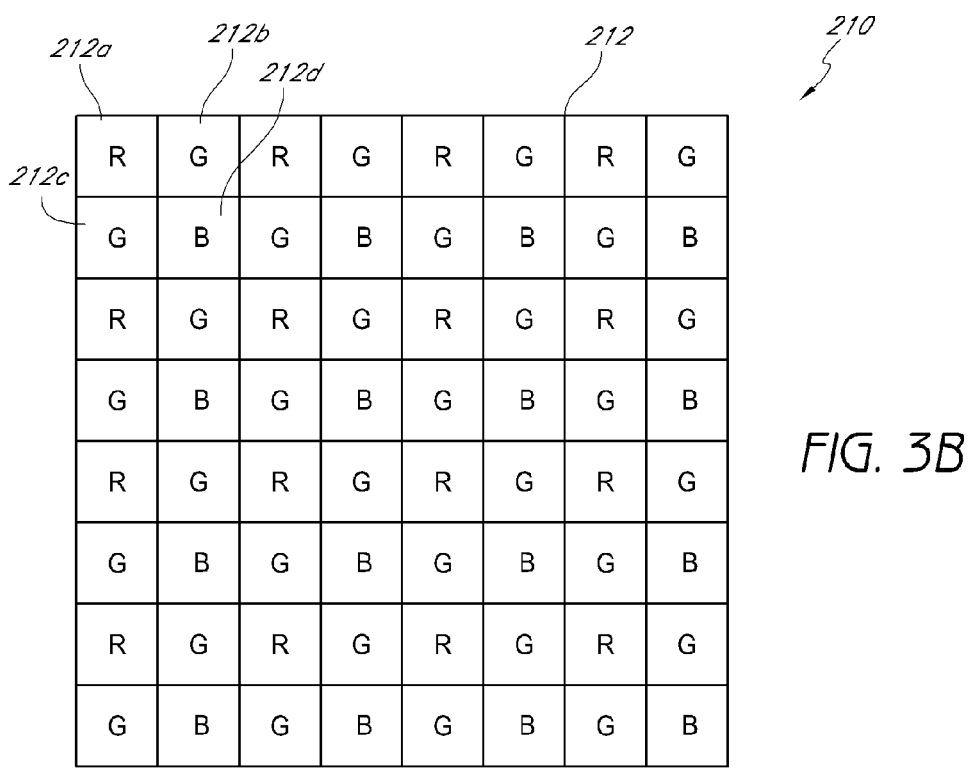
FIG. 3B is a schematic plan view of the image sensor of FIG. 3A.

FIG. 3A is a simplified perspective cut-away view of the image sensor 210, and FIG. 3B is a schematic plan view of the image sensor 210. The image sensor 210 includes a photosite array 211 and a Bayer color filter 212 (hereinafter referred to as "Bayer filter 212"). The photosite array 211 includes two-dimensional array of photosites 211a. Each photosite 211a typically includes at least one photoelectric device that converts incident light into a corresponding analog electrical value, such as a voltage or a current.

In order to facilitate color image sensing the image sensor 210 includes the Bayer filter 212 that is arranged in combination with the photosite array 211. Bayer filters are frequently used because a Bayer filter can be configured to mimic the physiology of the human eye by including twice as many green filters as red filters or blue filters. To that end, the Bayer filter 212 is configured to include a repeated two-by-two color filter pattern, which is shown schematically in FIG. 3B. The two-by-two color filter pattern includes two green filters 212b, 212c arranged along one diagonal, and one red filter 212a and one blue filter 212d arranged along the other diagonal. The two-by-two color filter pattern is repeated across the photosite array 211.

The combination of the Bayer filter 212 and the photosite array 211 form an array of three interlaced grids, each of which is sensitive to one of red, green, or blue light. In operation, a single color is sampled at each photosite because each photosite is sensitive to one of red, green, or blue light. The raw output of the image sensor 210, including the Bayer filter 212, is known as a Bayer pattern image. Employing this configuration a single photosite does not fully determine a spectrum of color by itself because each photosite is individually configured to sense only one of three colors. To obtain a full-color image, a demosaicing algorithm is typically used to interpolate the Bayer pattern image.

One problem with image sensors that utilize Bayer filters and the like is that decimation in the analog domain using previously available techniques often reduces the quality of reconstructed image. For example, a known analog domain decimation technique is limited to a simple equally-weighted averaging of photosite outputs. Decimation by an even-factor, such as by two or six, using simple equally-weighted averaging of photosite outputs in the analog domain results in effective sampling locations that are unevenly spaced apart. However, display devices are commonly configured to display pixels or sampling locations that are presumed to be evenly spaced. Standard interpolation methods assume that the effective sampling locations are evenly spaced because it is computationally more expensive to interpolate unevenly spaced effective sampling locations. In turn, interpolation of the unevenly spaced effective sampling locations generates image artifacts that reduce the quality of the reconstructed image in the smaller format because standard interpolation methods assume that the effective sampling locations are evenly spaced.

Previously available solutions address this problem by decimating the image in the digital domain, as described above with reference to FIG. 2. Decimation in the digital domain relies on analog-to-digital conversion of a full resolution still image produced by the image sensor 210. Analog-to-digital conversion of a full resolution still image is computationally expensive, reduces readout speed and increases system power consumption. Moreover, analog-to-digital conversion of a full resolution still image is also relatively inefficient because a substantial amount of information from the full resolution still image is discarded in the digital domain decimation process. In other words, time, energy and computational effort are used to convert information into the digital domain that is of little or no subsequent value in the digital domain. Accordingly, there lies a challenge to implement an image decimation scheme that may be less computationally expensive, may improve readout speeds, and may have relatively lower system power consumption.

Figure 4A:
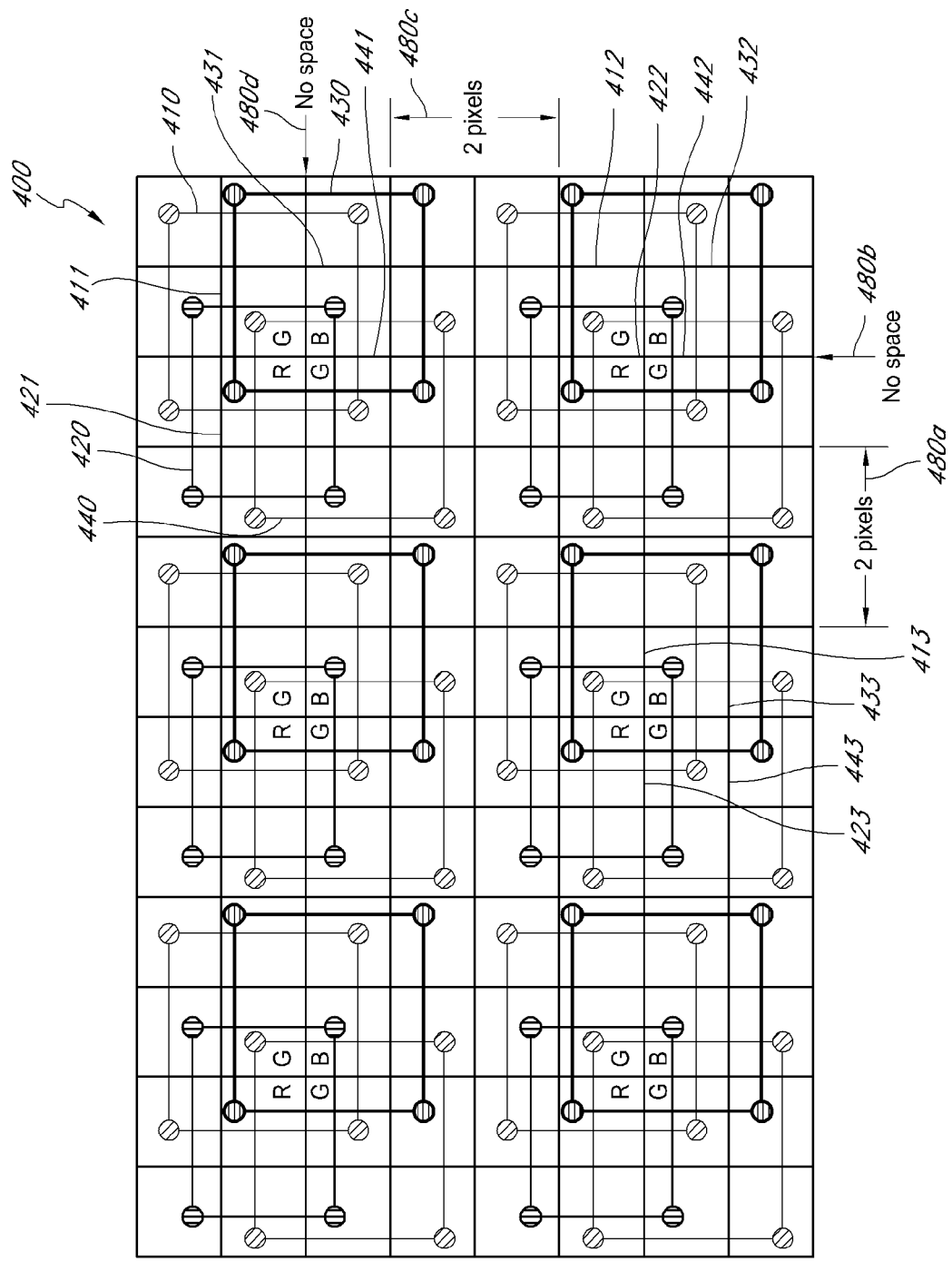
FIG. 4A is a schematic plan view of an example number of effective sampling locations produced by a simple averaging of respective sub-groups of photosite outputs of a Bayer pattern image using 2×2 decimation.

The aforementioned problems are emblematic of decimation schemes that combine an even number of photosite outputs along at least one of the two dimensions that define the photosite array. Illustrative of the aforementioned problems, FIG. 4A is a schematic plan view of an example number of unevenly spaced effective sampling locations produced by a simple averaging of respective sub-groups of photosite outputs comprising a Bayer pattern image using 2×2 decimation. FIG. 4A includes a schematic representation of a portion of a Bayer pattern image 400 comprising a two-dimensional array of photosite outputs. In accordance with a 2×2 decimation process the photosite outputs are grouped into 2×2 sub-arrays on a per color basis to produce respective effective sampling locations.

For example, a first sub-array 410 includes the outputs of four green-sensitive photosites, each of which is located on a respective corner of the first sub-array 410 within the Bayer pattern image 400. A simple equally-weighted averaging of these four outputs results in an effective sampling location 411 that is located at the center of the four green-sensitive photosite outputs in the Bayer pattern image 400. Numerous other green effective sampling locations corresponding to decimated green-sensitive photosite outputs from the portion of the Bayer pattern image 400 are also shown, two of which are denoted as 412, 413.

Similarly, a second sub-array 420 includes the outputs of four red-sensitive photosites, each of which is located on a respective corner of the second sub-array 420 in the Bayer pattern image 400. A simple equally-weighted averaging of these four outputs results in an effective sampling location 421 that is located at the center of the four red-sensitive photosites in the Bayer pattern image 400. Numerous other red effective sampling locations corresponding to decimated red-sensitive photosite outputs from the portion of the Bayer pattern image 400 are also shown, two of which are denoted as 422, 423.

Similarly a third sub-array 430 includes the outputs of four blue-sensitive photosites, each of which is located on a respective corner of the third sub-array 430 within the Bayer pattern image 400. A simple equally-weighted averaging of these four outputs results in an effective sampling location 431 that is located at the center of the four blue-sensitive photosite outputs in the Bayer pattern image 400. Numerous other blue effective sampling locations corresponding to decimated blue-sensitive photosite outputs from the portion of the Bayer pattern image 400 are also shown, two of which are denoted as 432, 433.

Similarly, a fourth sub-array 440 includes the outputs of another four green-sensitive photosites, each of which is located on a respective corner of the fourth sub-array 440 within the Bayer pattern image 400. A simple equally-weighted averaging of these four outputs results in an effective sampling location 441 that is located at the center of the four green-sensitive photosite outputs in the Bayer pattern image 400. Numerous other green effective sampling locations corresponding to decimated green-sensitive photosite outputs from the portion of the Bayer pattern image 400 are also shown, two of which are denoted as 442, 443.

As noted above, a problem with even-factor decimation in the analog domain using previous available techniques is that adjacent effective sampling locations are unevenly spaced. As illustrated in FIG. 4A, between some adjacent effective sampling locations, there is a spacing of approximately three pixels (or sampling locations), whereas the spacing between other adjacent effective sampling locations is approximately one pixel pitch. More specifically, there is a spacing of approximately three pixels, denoted by 480a, between adjacent effective sampling locations 433 and 442. By contrast, the spacing, denoted by 480b, between effective sampling locations 442 and 432 is about one pixel pitch. In another example, there is a spacing of approximately three pixels, denoted by 480c, between effective sampling locations 412 and 431, but the spacing, denoted by 480d, between effective sampling locations 411 and 431 is about one pixel pitch.

Figure 4B:
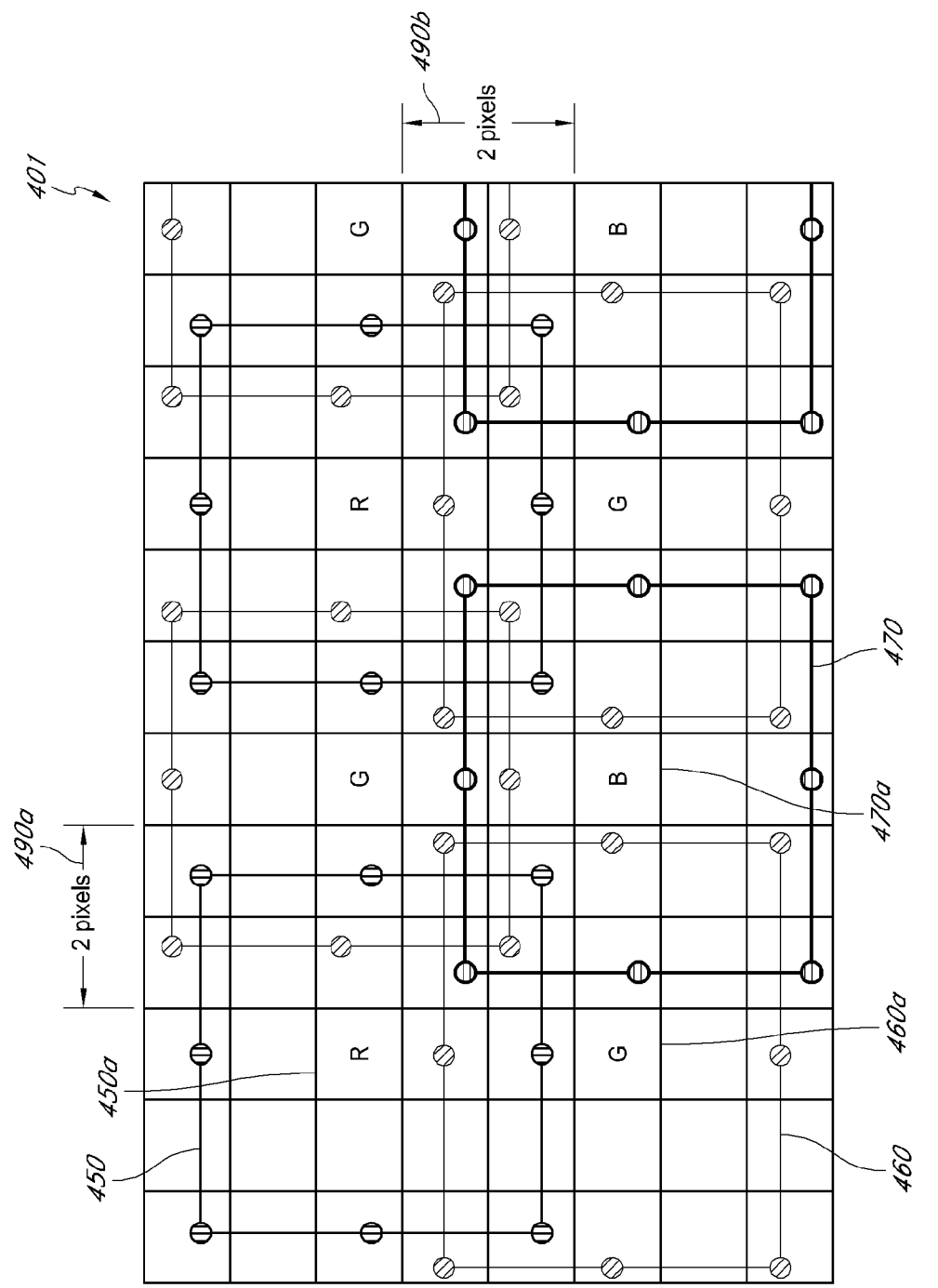
FIG. 4B is a schematic plan view of an example number of effective sampling locations produced by a simple averaging of respective sub-groups of photosite outputs of a Bayer pattern image using 3×3 decimation.

By contrast, FIG. 4B is a schematic plan view of an example number of evenly spaced effective sampling locations produced by a simple averaging of respective sub-groups of photosite outputs comprising a Bayer pattern image using 3×3 decimation. FIG. 4A includes a schematic representation of a portion of a Bayer pattern image 401 comprising a two-dimensional array of photosite outputs. Similar to the 2×2 decimation process described above, in accordance with a 3×3 decimation process the photosite outputs are grouped into 3×3 sub-arrays for each color to produce respective effective sampling locations.

For example, a first sub-array 450 includes the outputs of eight red-sensitive photosites, each of which is located along an edge and/or a corner of the first sub-array 450 within the Bayer pattern image 401 and the red-sensitive photosite located at the center of the first sub-array 450. A simple equally-weighted averaging of these eight outputs results in a red effective sampling location 450a that is located at the center of the eight red-sensitive photosite outputs in the Bayer pattern image 401. Numerous other red effective sampling locations corresponding to decimated red-sensitive photosite outputs from the portion of the Bayer pattern image 401 are also shown, but not specifically denoted by a reference indicia. Similarly, a second sub-array 460 includes the outputs of eight green-sensitive photosites, each of which is located along an edge and/or corner of the second sub-array 460 within the Bayer pattern image 401, and the green-sensitive photosite located at the center of the second sub-array 460. A simple equally-weighted averaging of these eight outputs results in a green effective sampling location 460a that is located at the center of the eight green-sensitive photosite outputs in the Bayer pattern image 401. Numerous other green effective sampling locations corresponding to decimated green-sensitive photosite outputs from the portion of the Bayer pattern image 401 are also shown, but not specifically denoted by a reference indicia. Similarly, a third sub-array 470 includes the outputs of eight blue-sensitive photosites, each of which is located along an edge and/or corner of the third sub-array 470 within the Bayer pattern image 401, and the blue-sensitive photosite located at the center of the third sub-array 470. A simple equally-weighted averaging of these eight outputs results in a blue effective sampling location 470a that is located at the center of the eight blue-sensitive photosite outputs in the Bayer pattern image 401. Numerous other blue effective sampling locations corresponding to decimated blue-sensitive photosite outputs from the portion of the Bayer pattern image 401 are also shown, but not specifically denoted by a reference indicia. Each of the effective sampling locations 450a, 460a, 470a is spaced apart from other effective sampling locations by approximately two pixels as denoted for example by 490a and 490b.

Figure 5:
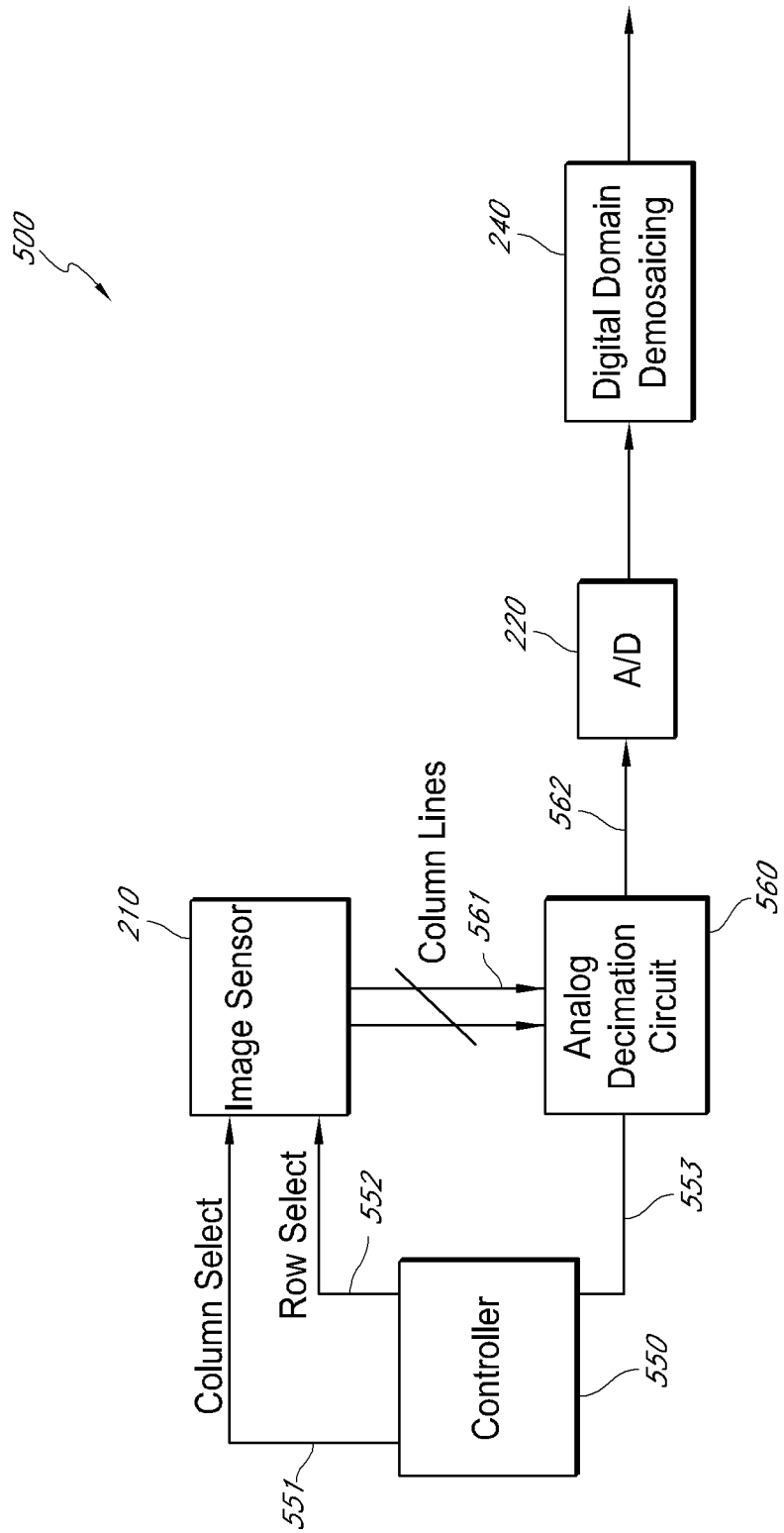
FIG. 5 is a simplified block diagram of an example of an implementation of an image sensor system including various features within the scope of the appended claims.

FIG. 5 is a simplified block diagram of an example implementation of an image sensor system 500 including various features within the scope of the appended claims. The image sensor system 500 illustrated in FIG. 5 is provided to merely illustrate some of the more pertinent features of various implementations within the scope of the appended claims. Those skilled in the art will appreciate from the present disclosure that an image sensor system may have more or less components than the simplified block diagram of the image sensor system 500 illustrated in FIG. 5. Those skilled in that art will also appreciate that at least some of the function blocks included in the image sensor system 500 of FIG. 5 may be implemented in any combination of hardware, software and/or firmware.

The image sensor system 500 includes an image sensor 210. In one implementation, the image sensor 210 includes a photosite array in combination with a Bayer filter as described above with reference to FIGS. 3A and 3B. Other types of color filter can be used with a photosite array. The image sensor system 500 also includes a controller 550, an analog decimation circuit 560, an analog-to-digital converter 220 and a digital domain demosaicing processor 240.

The controller 550 is configured to provide a column select control signal 551 and a row select control signal 552 to the image sensor 210, and also a control signal 553 to the analog decimation circuit 560. While the common terminology of columns and rows is used herein, it will be understood that no particular dimension or orientation across the photosite array is implied by the terminology. Thus, a column can be either vertical or horizontal, and a row can be either vertical or horizontal. The image sensor 210 is also selectively connectable to the analog decimation circuit 560 along column lines 561. The analog decimation circuit 560 provides a decimated analog output signal 562 to the analog-to-digital converter 220. The analog-to-digital converter 220 provides an output to the digital domain demosaicing processor 240. For the sake of clarity the image sensor system 500 illustrated in FIG. 5 merely includes the more pertinent connections between the various functional blocks, and that other connections are possible. In another implementation, the column select control signal 551 may be provided to the analog decimation circuit 560 so that selective sampling of the photosites occurs exclusively within the analog decimation circuit 560. Those skilled in the art will appreciate that numerous configurations are possible, and the implementations discussed herein is merely one example of many possible implementations.

In operation, the outputs of the photosite array of the image sensor 210 are included in the set of raw analog electrical values of a corresponding full resolution still image captured by the image sensor 210. In one implementation, the column select control signal 551 and the row select control signal 552 are utilized to select sub-arrays of photosite outputs from the photosite array of the image sensor 210. The photosite outputs are provided to the analog decimation circuit 560 on column lines 561 one row at a time. In some implementations, more than one row of photosite outputs are provided to the analog decimation circuit 560 at a time. In such implementations, additional parallel columns lines are included to enable the readout of photosite outputs from multiple rows in the selected columns. In some implementations, the sub-arrays are selected on a per color basis in order decimate the photosite outputs on a per color basis, as described below in greater detail. In some implementations, the two or more sub-arrays corresponding to two or more respective colors in one region of the photosite array are selected using the column select control signal 551 and the row select control signal 552. In turn, photosite outputs for two or more colors are decimated in parallel, which may even further enhance the speed of the image sensor system 500 in some implementations. Those skilled in the art will appreciate from the description herein that various arrangements for reading combinations of photosite outputs serially and/or in parallel are possible, and for the sake of brevity only a few examples have been described herein.

As described in further detail below, the analog decimation circuit 560 is configured to effectuate an even-factor decimation of photosite outputs according to an unequally-weighted-average function. In some implementations, the unequally-weighted-average even-factor decimation methods disclosed herein produce substantially more evenly spaced effective sampling locations as compared to the equally-weighted-average even-factor decimation processes previously used in the analog domain. The decimated analog output signal 562 includes the effective sampling locations, which, as described above, form a respective smaller-format image of the full resolution image. The effective sampling locations are converted by the analog-to-digital converter 220 into digital values. The digital domain demosaicing processor 240 interpolates the digital values to obtain a data set for a full-color image.

Figure 6:
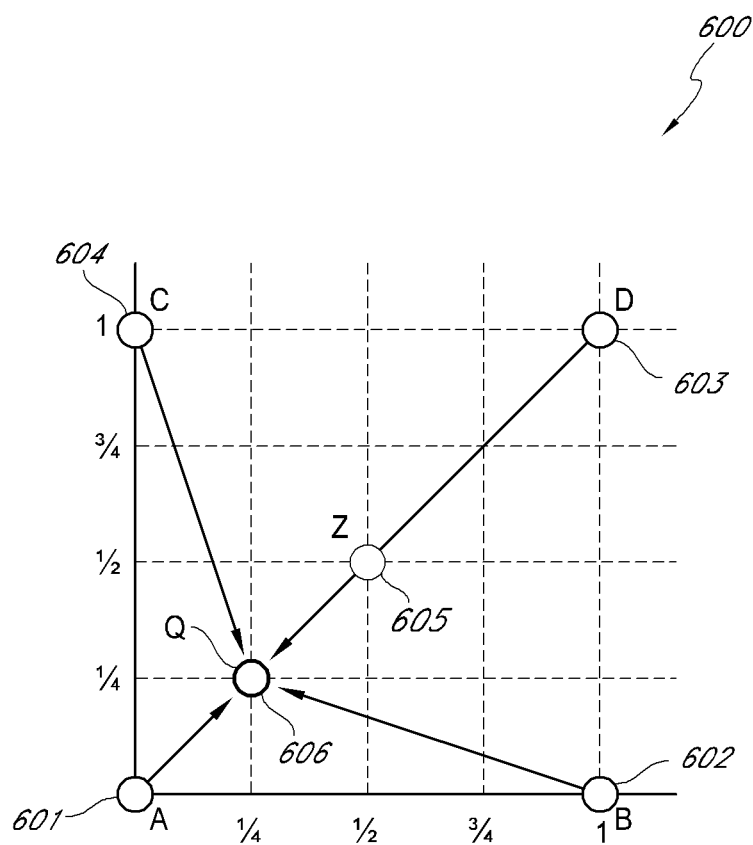
FIG. 6 is a normalized sampling location grid.

FIG. 6 is a normalized sampling location grid 600 provided to schematically illustrate the adjustment made to an example effective sampling location in accordance with an implementation of the methods disclosed herein. FIG. 6 includes four photosite outputs 601, 602, 603, 604 that may be decimated into a single effective sampling location using a 2×2 decimation process. The four photosite outputs 601, 602, 603, 604, also denoted A, B, D, C, are provided by four respective photosites that are each sensitive to one particular color as a result of a Bayer filter (or other filter) provided in combination with the photosites. For the sake of example, the nearest distance between two photosites, and thus the resolution of the photosite outputs, has been normalized to 1. For example, as illustrated in FIG. 6, the distance between photosite outputs 601 and 602 is 1, the distance between photosite outputs 601 and 604 is 1, the distance between photosite outputs 603 and 602 is 1, and the distance between photosite outputs 603 and 604 is 1.

A 2×2 decimation process employing simple equally-weighted averaging produces a fifth effective sampling location 605, also denoted Z, which is located in the geometric middle of the four photosite outputs 601, 602, 603, 604 on the normalized grid 600. With reference to the normalized grid 600, the fifth effective sampling location is located at coordinates denoted $$\left(\frac{1}{2}, \frac{1}{2}\right).$$

However, as described at length above with reference to FIG. 4A, a collection of similarly generated effective sampling locations generated from a Bayer pattern image are substantially unevenly spaced with respect to one another. By contrast, as provided by various methods disclosed herein, a sixth effective sampling location 606 located at approximately $$\left(\frac{1}{4}, \frac{1}{4}\right)$$

provides substantially more even spacing between a collection of similarly generated effective sampling locations generated from the same Bayer pattern image.

In one implementation, an effective sampling location located at approximately $$\left(\frac{1}{4}, \frac{1}{4}\right)$$

on the normalized grid 600 can be generated by determining an unequally-weighted-average of the four photosite outputs 601, 602, 603, 604. In order to generate an unequally-weighted-average at least one of the photosite outputs is given a weighting value that is different from at least one other photosite output. As described below, there are multiple methods of determining one or more weights applied in the unequally-weighted-average generation of an effective sampling location.

In one implementation, linear interpolation can be used to determine a set of linear weights applied to at least one of the four photosite outputs 601, 602, 603, 604. For example, as shown in equation (1), the desired location of photosite output Q (606) can be expressed as half the distance between the first photosite output A (601) and the less desirable effective sampling location Z (605) produced by the average of all four outputs 601, 602, 603, 604.

$$Q = \frac{A+Z}{2} \quad (1)$$

Z is also expressed by equation (2).

$$Z = \frac{A+B+C+D}{4} \quad (2)$$

Solving equation (1) with equation (2) yields a value for Q shown by equation (3).

$$Q = \frac{5A+B+C+D}{8} \quad (3)$$

For the sake of implementation simplicity, the denominator of 8 can be ignored and the corresponding weights for the photosite outputs in the weighted-average calculation are approximated as 5, 1, 1, 1 for the respective photosite outputs A, B, C, D. In other words, photosite output A (601) is multiplied by a factor of 5, and photosite outputs B, C, D each have a weight of 1.

In another implementation, second order interpolation can be used to determined weights for the respective photosite outputs A, B, C, D. For example, equation (4) may be used for second order interpolation.

$$f(x) = (2A+2D-4Z)x^2 + (-3A-D+4Z)x + A \quad (4)$$

With reference to equation (4), $$f\left(\frac{1}{4}\right)$$

yields weights of 9, 3, 3, 1 for the respective photosite outputs A, B, C, D. Moreover, while weighting factors derived by linear and second order interpolation are specifically described herein, those skilled in the art will appreciate from the present description that $n^{th}$ order interpolation techniques may be used to derive weighting factors.

In one implementation, the respective photosite outputs A, B, C, D are voltages, and a corresponding unequally-weighted-average decimated voltage can be determined using a number of capacitors, that is, voltage mode. In another implementation, four capacitors can be sized to produce the weighted-average voltage. In another implementation, the number and control of the capacitors can be selected to produce the weighted-average voltage.

Figure 7:
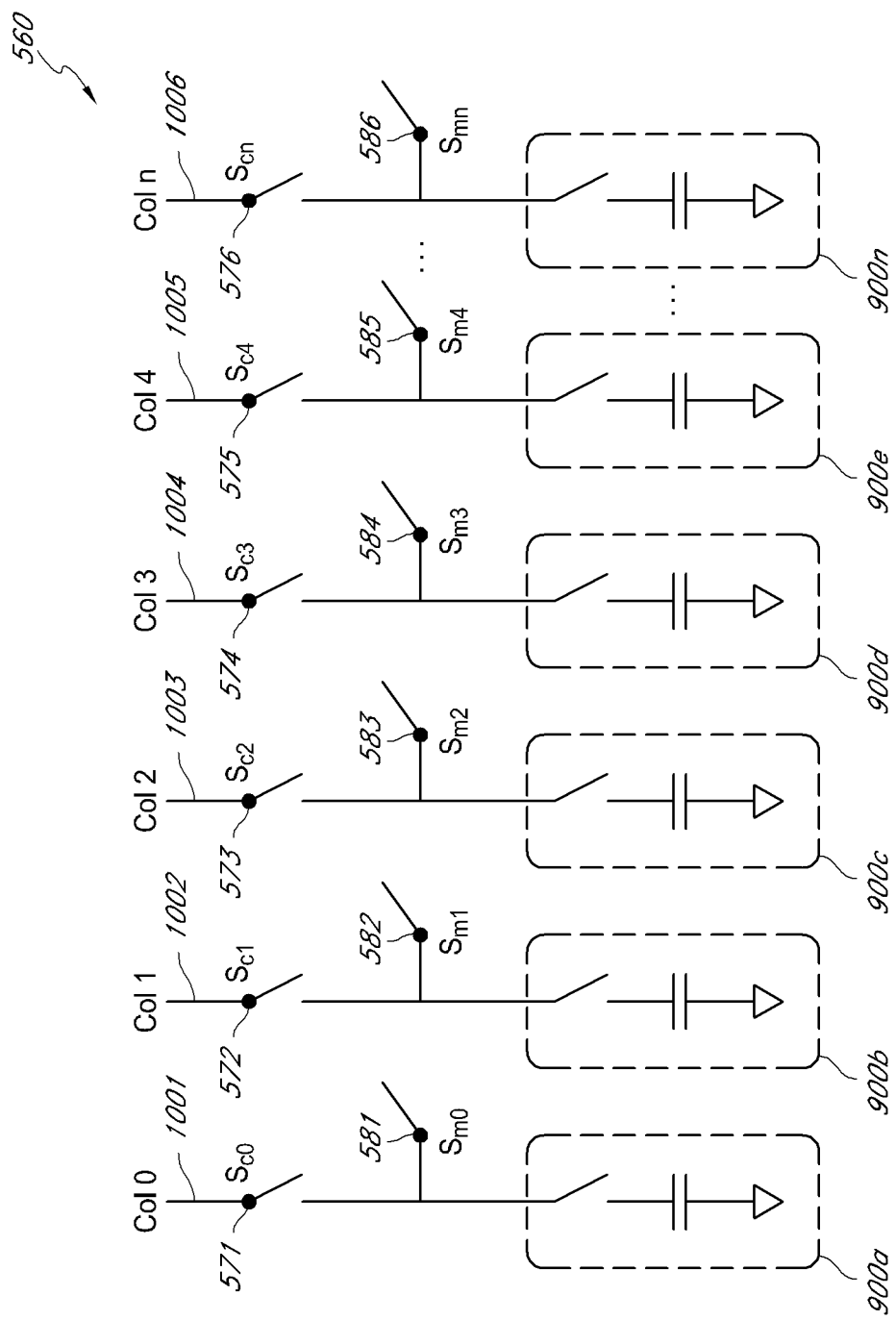
FIG. 7 is a simplified diagram of an example of an implementation of an analog decimation circuit.

FIG. 7 is a simplified diagram of an example of an implementation of an analog decimation circuit 560 operable to decimate voltage-mode photosite outputs, that is, an implementation in which photosite outputs are voltage values. In particular, in one implementation, the analog decimation circuit 560 may be configured to effectuate even-factor decimation based on an unequally-weighted-average of voltage mode photosite outputs to yield effective sampling locations that are substantially evenly spaced. The analog decimation circuit 560 includes a plurality of column lines Col 0, Col 1, Col 2, Col 3, Col 4 . . . Col n denoted 1001, 1002, 1003, 1004, 1005, 1006, respectively. The precise number of column lines is a function of at least the number of columns in a photosite array and how many rows are read out from the columns at a time. As such, those skilled in the art will appreciate from the present disclosure that the precise number of columns lines is a matter of design choice and is generally implementation specific. For example, in one example implementation, 3840 column lines are provided for a photosite array having 3840 columns in a system in which one row is read out at a time. In anther example implementation, two columns lines are provided for each of the columns in the photosite array to enable two rows to be read from the photosite array simultaneously.

Each column line 1001, 1002, 1003, 1004, 1005, 1006 includes a respective column connect switch 571, 572, 573, 574, 575, 576 and a respective bank of sampling capacitors 900a, 900b, 900c, 900d, 900e, 900n, which are illustrated schematically. As described in further detail below with reference to FIGS. 8 and 11, each sampling capacitor is connectable to its respective column line by a sampling switch included in the bank of sampling capacitors.

A plurality of mixing switches 581, 582, 583, 584, 585, 586 selectively connects adjacent banks of sampling capacitors. For example, the first and second banks of sampling capacitors 900a and 900b are selectively connectable via the first mixing switch $S_{m0}$ 581. Similarly, the second and third banks of sampling capacitors 900b and 900c are selectively connectable via the second mixing switch $S_{m1}$ 582. Similarly, the third and fourth banks of sampling capacitors 900c and 900d are selectively connectable via the third mixing switch $S_{m2}$ 583. Similarly, the fourth and fifth banks of sampling capacitors 900d and 900e are selectively connectable via the fourth mixing switch $S_{m3}$ 584, etc.

Figure 8:
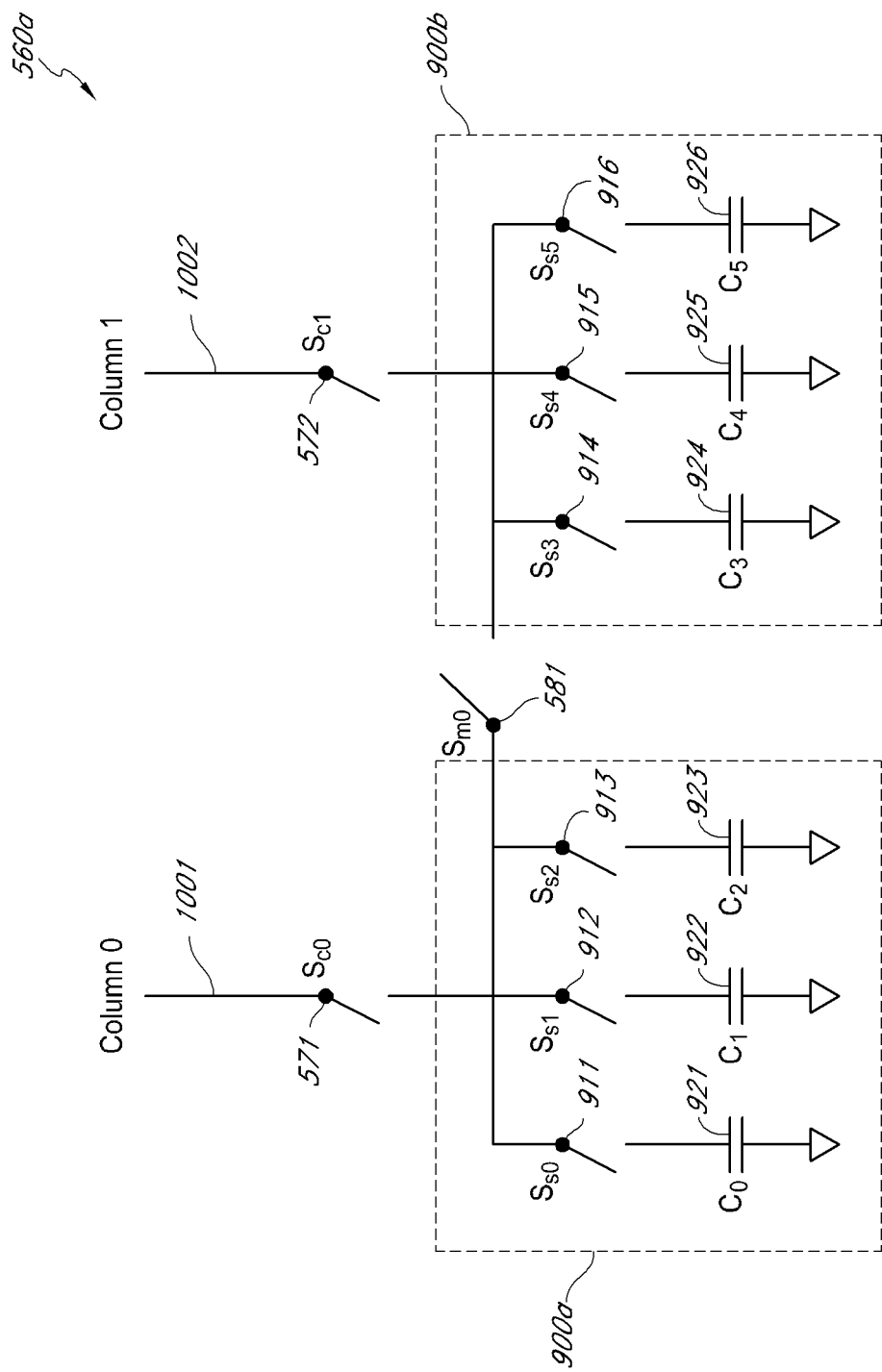
FIG. 8 is a simplified diagram of an example of an implementation of an analog decimation circuit.

FIG. 8 is a simplified diagram of a portion of the analog decimation circuit 560a of FIG. 7 according to one possible implementation. More specifically, FIG. 8 further illustrates some of the components associated with the first and second column lines 1001, 1002 of the analog decimation circuit 560*a* configured to implement the weighting factors (5, 1, 1, 1) determined by linear interpolation, as described above with reference to FIG. 6. As such, elements common to both FIGS. 7 and 8 share common reference indicia, and only differences between FIGS. 7 and 8 are described herein for the sake of clarity.

In particular, a specific arrangement of three sampling capacitors and three sampling switches is included in each of the first and second banks of sampling capacitors 900*a*, 900*b*. Specifically, the first bank of sampling capacitors 900*a* includes three parallel branches stemming from the first column line 1001 via the column connect switch 571. The portion of the column line 1001 on the other side of the column connect switch 571 is connectable to a respective column of photosites in the photosite array. Each branch includes one of three respective sampling capacitors 921, 922, 923 and one of three respective sampling switches 911, 912, 913 connectable in series. That is, the first branch includes the first sampling switch 911 and the first sampling capacitor 921 connectable in series between the column line 1001 and ground, the second branch includes the second sampling switch 912 and the second sampling capacitor 922 connectable in series between the column line 1001 and ground, and the third branch includes the third sampling switch 913 and the third sampling capacitor 923 connectable in series between the column line 1001 and ground. The second bank of sampling capacitors 900*b* also includes three similarly arranged parallel branches. Each branch in the second bank of sampling capacitors 900*b* includes one of three respective sampling capacitors 924, 925, 936 and one of three respective sampling switches 914, 915, 916 connectable in series between the second column line 1002 and ground.

In operation, four photosite output voltages (from two columns and two rows) are mixed on the combination of the six sampling capacitors 921, 922, 923, 924, 925, 936 through selective control of the switches 571, 572, 581, 911, 912, 913, 914, 915, 916. In particular, in one implementation, the switches of the analog decimation circuit 560*a* are operable to effectuate 2×2 decimation using unequally-weighted-averaging, with weights of (5, 1, 1, 1). To that end, FIGS. 9A, 9B and 9C are block diagrams representing various stages of an example analog domain decimation process provided by operating the analog decimation circuit 560*a* of FIG. 8.

Figure 9:
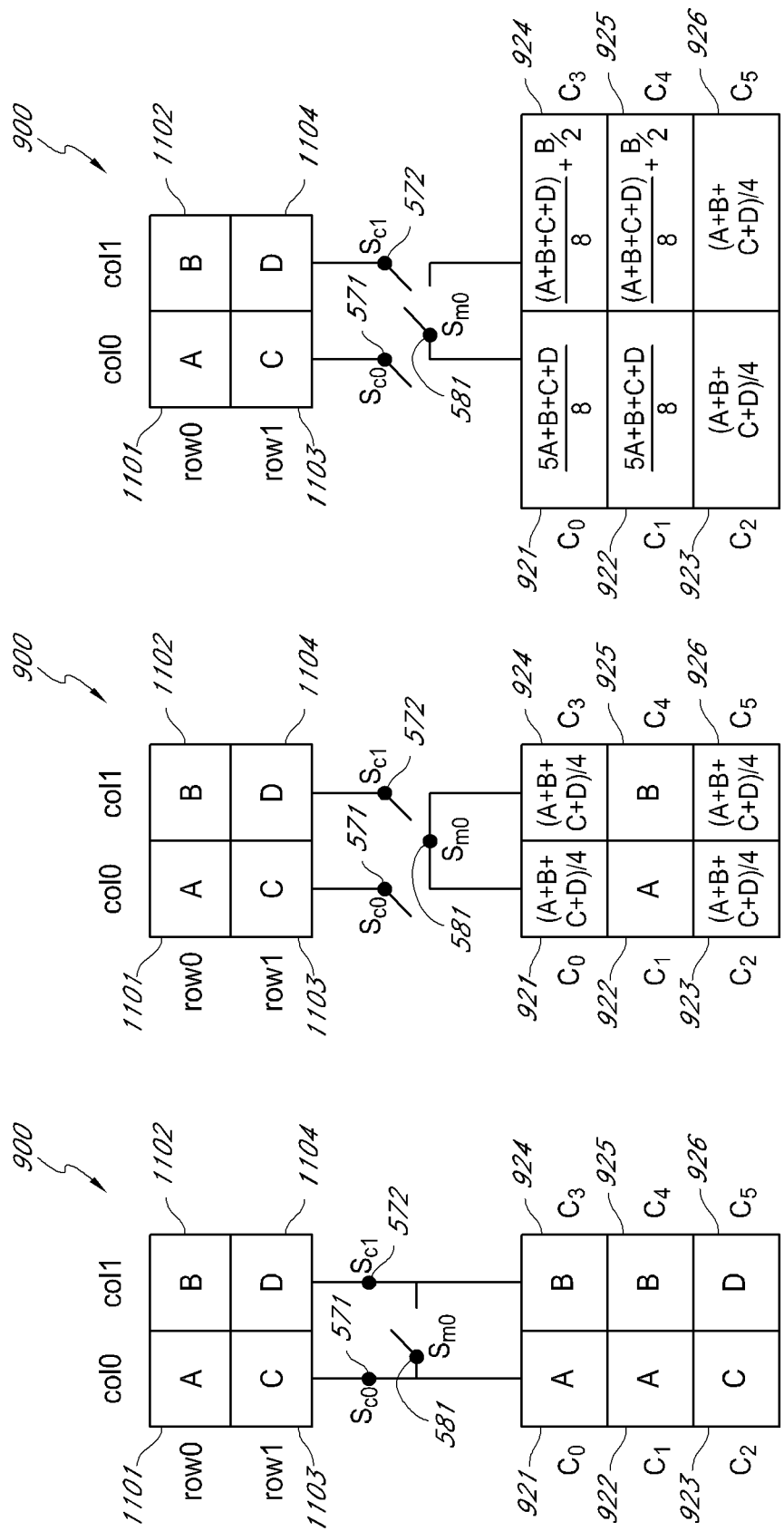
FIGS. 9A, 9B and 9C are simplified block diagrams representing the mixing of photosite voltage outputs at various stages of analog domain decimation provided by the analog decimation circuit of FIG. 8.

With reference to FIGS. 9A-9C, and continued reference to FIG. 8, four photosites 1101, 1102, 1103, 1104 from within a photosite array (not shown) provide four respective photosite output voltages A, B, C, D (the same reference letters are used as above for the sake of continuity and convenience). Photosites 1101 and 1102 are in the first and second columns of a first row and photosites 1103 and 1104 are in the first and second columns of a second row. The first and second rows and first and second columns may not be directly adjacent one another, and often there are other photosites between the four photosites 1101, 1102, 1103, 1104. For example, when the four photosites 1101, 1102, 1103, 1104 correspond to red-sensitive photosites from an image sensor having a Bayer filter there are other photosites between the four photosites 1101, 1102, 1103, 1104.

With reference to FIG. 9A, the method includes reading the photosite output voltages A, B, C, D onto the six sampling capacitors 921, 922, 923, 924, 925, 936. In one implementation, photosite output voltages A and B from photosites 1101 and 1102 are read onto respective sampling capacitors 921, 922 and 924, 925, and photosite output voltages C and D are read onto sampling capacitors 923 and 926, respectively. With further reference to FIG. 8, this may be accomplished by opening the mixing switch 581, closing the column connect switches 571 and 572, and selectively controlling the sampling switches to direct the photosite output voltages A, B, C, D to the respective sampling capacitors as described.

With reference to FIG. 9B, and continued reference to FIG. 8, mixing to effectuate unequally-weighted-averaging of the photosite output voltages A, B, C, D includes opening the switches 571, 572, 912, 915 to isolate the sampling capacitors 922, 925 and the photosites 1101, 1102, 1103, 1104. The mixing also includes closing the mixing switch 581 and the sampling switches 911, 913, 914, 916 to produce an intermediate equally-weighted average value of the photosite output voltages A, B, C, D, as provided by equation (3) above.

With reference to FIG. 9C, and continued reference to FIG. 8, the mixing further includes opening the mixing switch 581 to isolate the first and second banks of sampling capacitors 900*a*, 900*b* from one another. The mixing further includes opening sampling switches 913 and 916, and closing switches 912, 915. As a result, the voltages on sampling capacitors 921 and 922 combine and the voltages on sampling capacitors 924 and 925 also combine via charge distribution between the connected capacitors. As illustrated in FIG. 9C, the voltage on sampling capacitors 921 and 922 represents the desired weighted-average of the photosite output voltages A, B, C, D, and thus a desired effective sampling location.

Figure 10:
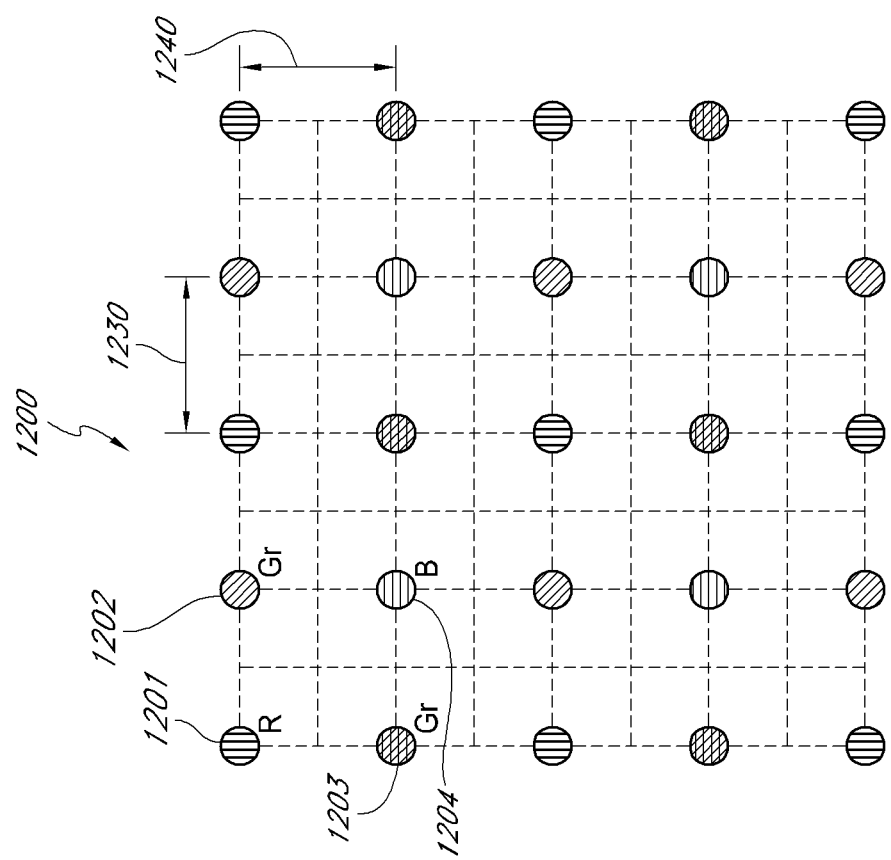
FIG. 10 is a normalized sampling location grid.

FIG. 10 is a normalized sampling location grid 1200 showing the locations of effective sampling locations produced by the 2×2 decimation process using unequally-weighted-averaging as described above. Each of the four effective sampling locations 1201*b*, 1202*b*, 1203*b*, 1204*b* correspond to decimated red, green, green, and blue pixels produced from four respective photosite output voltages each. The spacing, denoted by 1230, along one of two perpendicular axes is approximately two pixels, and the spacing, denoted by 1240, in the vertical direction along the second of two perpendicular axes is approximately two pixels.

Figure 11:
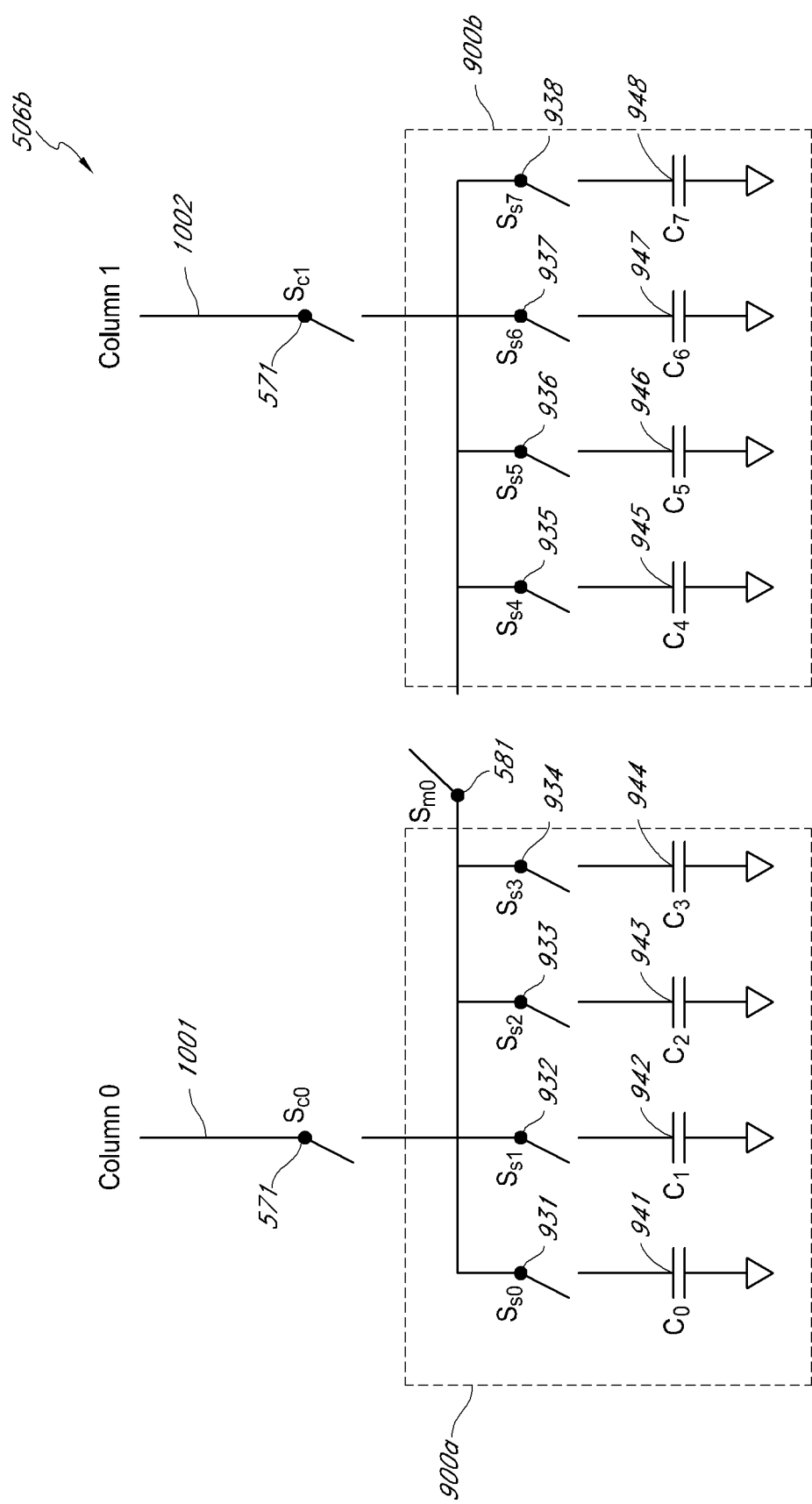
FIG. 11 is a simplified diagram of an example of an implementation of an analog decimation circuit.

FIG. 11 is a simplified diagram of a portion of the analog decimation circuit 560*a* of FIG. 7 according to another implementation. More specifically, FIG. 11 highlights some of the more pertinent components associated with the first and second column lines 1001, 1002 of the analog decimation circuit 560*a* configured to implement the weighting factors (9, 3, 3, 1) determined by second order interpolation, as described above with reference to FIG. 6. As such, elements common to both FIGS. 7 and 11 share common reference indicia, and only differences between FIGS. 7 and 11 are described herein for the sake of brevity.

In particular, a specific arrangement of four sampling capacitors and four sampling switches is included in each of the first and second banks of sampling capacitors 900*a*, 900*b*. Specifically, the first bank of sampling capacitors 900*a* includes four parallel branches stemming from the first column line 1001 via the column connect switch 571. The portion of the column line 1001 on the other side of the column connect switch 571 is connectable to a respective column of photosites in the photosite array. Each branch includes one of four respective sampling capacitors 941, 942, 943, 944 and one of four respective sampling switches 931, 932, 933, 934 connectable in series. That is, the first branch includes the first sampling switch 931 and the first sampling capacitor 941 connectable in series between the column line 1001 and ground, the second branch includes the second sampling switch 932 and the second sampling capacitor 942 connectable in series between the column line 1001 and ground, the third branch includes the third sampling switch 933 and the third sampling capacitor 943 connectable in series between the column line 1001 and ground, the fourth branch includes the fourth sampling switch 934 and the fourth sampling capacitor 944 connectable in series between the column line 1001 and ground. The second bank of sampling capacitors 900*b* also includes four similarly arranged parallel branches. Each branch in the second bank of sampling capacitors 900*b* includes one of four respective sampling capacitors 945, 946, 947, 948 and one of four respective sampling switches 935, 936, 937, 938 connectable in series between the second column line 1002 and ground.

In operation, four voltage photosite outputs (from two columns and two rows) are mixed on the combination of the eight sampling capacitors 941, 942, 943, 944, 945, 946, 947, 948 through selective control of the switches 571, 572, 581, 931, 932, 933, 934, 935, 936, 937, 938. In particular, in one implementation, the switches of the analog decimation circuit 560a is operable to effectuate 2×2 decimation using weighted-averaging, with weights of (9,3,3,1) described above with reference to FIG. 6. To that end, FIGS. 12A, 12B, 12C and 12D are block diagrams representing various stages of analog domain decimation provided by the analog decimation circuit 560a of FIG. 11.

With reference to FIGS. 12A-12D, and continued reference to FIG. 11, four photosites 1401, 1402, 1403, 1404 from within a photosite array (not shown) provide four respective photsite output voltages A, B, C, D (the same reference letters are used as above for the sake of continuity and convenience). Photosites 1401 and 1402 are in the first and second columns of a first row and photosites 1403 and 1404 are in the first and second columns of a second row. The first and second rows and first and second columns do not need to be directly adjacent one another, and there can be other photosites between the four photosites 1401, 1402, 1403, 1404. For example, when the four photosites 1401, 1402, 1403, 1404 correspond to red-sensitive photosites from an image sensor having a Bayer filter, there are other photosites between the four photosites 1401, 1402, 1403, 1404.

Figure 12:
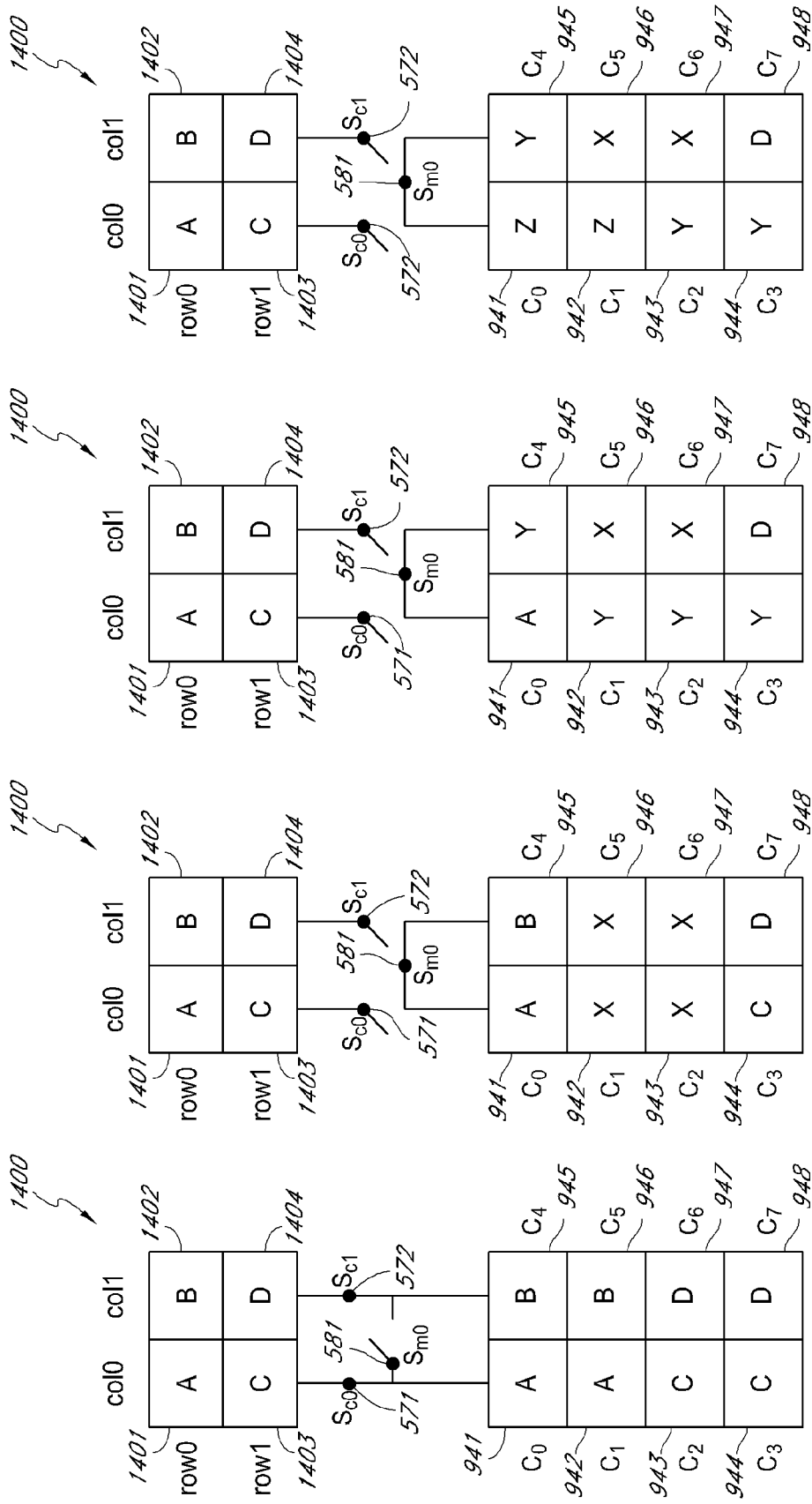
FIGS. 12A, 12B, 12C and 12D are simplified block diagrams representing the mixing of photosite voltage outputs at various stages of analog domain decimation provided by the analog decimation circuit of FIG. 11.

With reference to FIG. 12A, the method includes reading the photosite output voltages A, B, C, D onto the eight sampling capacitors 941, 942, 943, 944, 945, 946, 947, 948. In one implementation, photosite output voltages A and B from photosites 1401 and 1402 are read onto respective sampling capacitors 941, 942 and 945, 946, and photosite output voltages C and D are read onto respective sampling capacitors 943, 944 and 947, 948. With further reference to FIG. 11, this may be accomplished by opening the mixing switch 581, closing the column connect switches 571 and 572, and selectively controlling the sampling switches to direct the photosite output voltages A, B, C, D to the respective sampling capacitors as described above.

With reference to FIG. 12B, and continued reference to FIG. 11, mixing to effectuate an unequally-weighted-averaging of the photosite output voltages A, B, C, D includes opening the switches 571, 572, 931, 934, 935, 938. Further, mixing includes closing the mixing switch 581 and the sampling switches 932, 933, 936, 937 to produce an intermediate equally-weighted average of the photosite output voltages A, B, C, D, as provided by equation (3) above, and denoted by reference letter X in FIGS. 12B-12D.

With reference to FIG. 12C, and continued reference to FIG. 11, the mixing further includes closing switches 932, 933, 934 and 935. As a result, the voltages on sampling capacitors 942, 943, 944 and 945 combine to produce a voltage denoted by the reference letter Y. The voltage Y is expressed by equation (5) as follows.

$$Y = \frac{(2X + B + C)}{4} \quad (5)$$

With reference to FIG. 12D, and continued reference to FIG. 11, the mixing further includes closing switches 931 and 932 to connect sampling capacitors 941 and 942, and opening the other switches. As a result the, voltages on sampling capacitors 941 and 942 combine to produce a voltage denoted by the reference letter Z. The voltage Z is expressed by equation (6) as follows.

$$Z = \frac{(9A + 3B + 3C + D)}{16} \quad (6)$$

The voltage, Z, on sampling capacitors 941 and 942 represent the desired weighted-average of the photosite output voltages A, B, C, D, and thus a desired effective sampling location.

Figure 13:
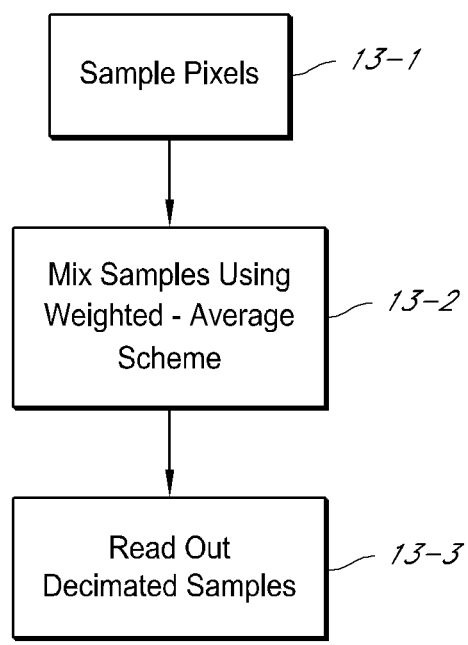
FIG. 13 is a flowchart graphically illustrating portions of an example method of decimation.

FIG. 13 is a flowchart graphically illustrating portions of a method of decimating a Bayer pattern image in the analog domain. As represented by block 13-1, the method includes sampling pixels from a Bayer pattern image. In some implementations, the samples from the Bayer pattern image are stored as respective voltage values on at least two parallel banks of capacitors. As represented by block 13-2, the method includes mixing the samples using a weighted-average scheme. As discussed above, in some implementations, the samples are mixed by selectively opening and closing switches connecting the capacitors storing the samples from the Bayer pattern image. As represented by block 13-3, the method includes reading out the decimated samples and converting the decimated samples into digital values.

Figure 14:
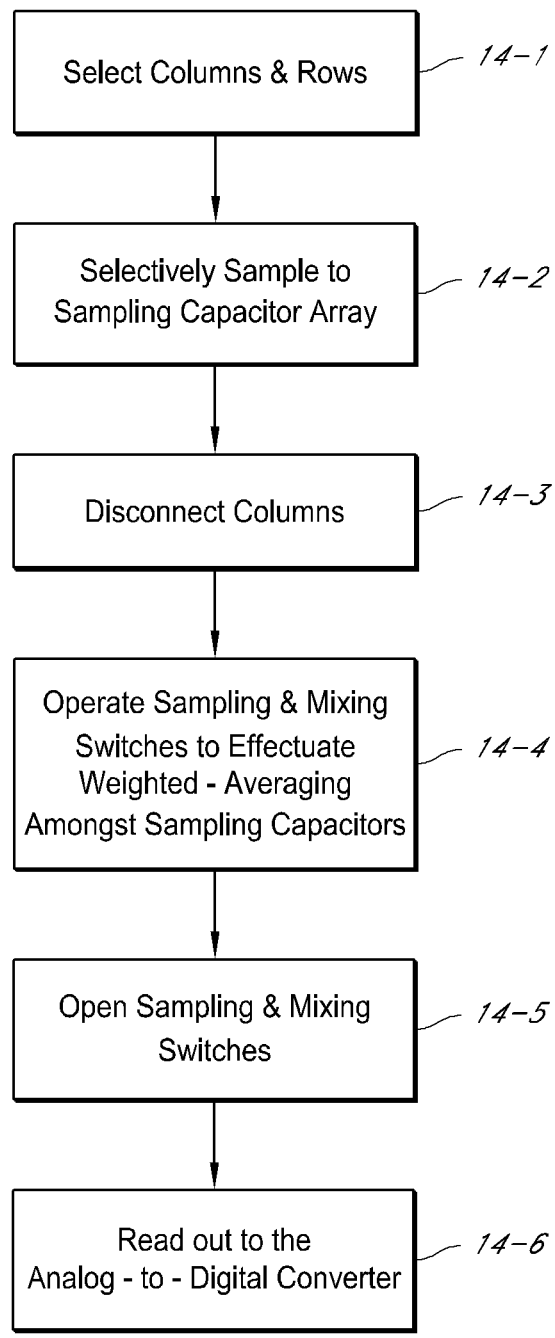
FIG. 14 is a flowchart graphically illustrating portions of an example method of decimation.

FIG. 14 is a flowchart graphically illustrating portions of a method of decimating a Bayer pattern image in the analog domain. As represented by block 14-1, the method includes selecting columns and rows from which to sample pixels from a Bayer pattern image. As represented by block 14-2, the method includes selectively sampling voltages from the photosites onto corresponding sampling capacitors within at least two parallel sampling capacitor arrays. As discussed above, the selected columns and rows intersect at pixels representing one color at time. In other words, the column and row selection results in selecting the red pixels independently of the green or blue pixels. The green and blue pixels are similarly processed.

As represented by block 14-3, the method includes disconnecting the respective columns from the at least two sampling capacitor arrays. As represented by block 14-4, the method includes operating a combination of sampling and mixing switches to effectuate a weighted-average decimation of the samples on the sampling capacitors. As represented by block 14-5, the method includes opening the sampling and mixing switches to end the weighted-average decimation. As represented by block 14-6, the method includes reading out the decimated sample from the sampling capacitor array.

Numerous inventive principles have been described above, and each has independent utility. In some cases, additional benefits and advantages are realized when the principles are utilized in various combinations with one another. For example, various embodiments of analog image processing arrangements have been described above. Elements of these individual embodiments, however, may be combined with any number of image processing systems. Such an imaging system may be implemented according to the principles and advantages of the embodiments to provide a decimation scheme that is relatively less computationally expensive, improves readout speeds, and has relatively lower system power consumption.

Some of the embodiments disclosed herein have been described with specific signals implemented as current-mode or voltage-mode signals, but the inventive principles also contemplate other types of signals, whether characterized as voltages or currents. Some semiconductor devices are specifically NPN or PNP BJTs (bipolar junction transistors), but in many cases different polarities or different device types such as J-FETs or CMOS transistors can also be utilized.

Moreover, the foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Moreover, decimation schemes employing the above described configurations can be implemented into various electronic devices or integrated circuits. Examples of the electronic devices can include, but are not limited to, consumer electronic products, parts of the consumer electronic products, electronic test equipments, etc. Examples of the electronic devices can also include memory chips, memory modules, circuits of optical networks or other communication networks, and disk driver circuits. The consumer electronic products can include, but are not limited to, a mobile phone, smart phone, cellular base stations, a telephone (including a videophone feature), a television, a computer monitor, a computer, a hand-held computer, a tablet computer, a personal digital assistant (PDA), a stereo system, a cassette recorder or player, a DVD player, a CD player, a VCR, an MP3 player, a radio, a camcorder, a camera, a digital camera (including a webcam), a portable memory chip, a copier, a facsimile machine, a scanner, a multi functional peripheral device, a wrist watch, a clock, etc. Further, the electronic device can include unfinished products.

Thus, the embodiments described herein can be modified in arrangement and detail without departing from the scope of the appended claims. So although specific embodiments have been described, other embodiments will be apparent to those of ordinary skill in the art from the disclosure herein. For example, a skilled artisan will recognize from the disclosure herein that various methods of manufacture, design, and materials can be used to make the various components described herein. Additionally, other combinations, omissions, substitutions and modifications will be apparent to the skilled artisan in view of the disclosure herein. It is contemplated that various aspects and features of the invention described can be practiced separately, combined together, or substituted for one another, and that a variety of combination and sub-combinations of the features and aspects can be made and still fall within the scope of the invention. Furthermore, the systems described above need not include all of the modules and functions described in the preferred embodiments. Accordingly, the present invention is not intended to be limited by the recitation of the specific embodiments described above, but is to be defined by reference to the appended claims.

What is claimed is:

1. An apparatus comprising:
a plurality of column connect switches configured to selectively connect outputs of photosites of a first row of an image sensor to respective column lines;
a plurality of electrical storage elements selectively connectable to the column lines;
a plurality of sampling switches configured to selectively connect each of the plurality of electrical storage elements to at least one of the column lines; and
a plurality of mixing switches configured to selectively connect at least two of the column lines,
wherein the column connect switches, the sampling switches, and the mixing switches are controllable to:
store selected outputs of the photosites of the first row of the image sensor in the plurality of electrical storage elements; and
combine with unequal weighting an even number of the selected outputs of the photosites of the first row stored in the plurality of electrical storage elements to effectuate unequally-weighted average even-factor decimation in the analog domain; and
wherein the unequally-weighted average even-factor decimation produces an effective sampling location for a sub-array of the photosites, wherein the sub-array includes adjacent photosites of the same color and the same row or column of the image sensor, wherein the effective sampling location is at a distance from an average location of the photosites of the sub-array.

2. The apparatus of claim 1, further comprising:
a controller configured to provide control signals to the column connect switches, the sampling switches, and the mixing switches to:
store selected outputs of the photosites of a column of the image sensor in the plurality of electrical storage elements; and
combine with unequal weighting an even number of the outputs of the photosites of the column stored in the plurality of electrical storage elements to effectuate even-factor decimation of photosite outputs in the analog domain.

3. The apparatus of claim 2, wherein the controller is further configured to provide at least one column select signal and row select signal.

4. The apparatus of claim 2, wherein the controller is configured to effectuate unequally-weighted average 2×2 decimation by providing control signals to the column connect switches, the sampling switches and mixing switches.

5. The apparatus of claim 1, further comprising the image sensor having a photosite array and a color filter.

6. The apparatus of claim 5, wherein the color filter comprises a Bayer filter.

7. The apparatus of claim 5, wherein the color filter at least in part contributes to the generation of photosite outputs that are interpretable by a demosaicing algorithm.

8. The apparatus of claim 1, wherein the electrical storage elements are configured to store output voltages of the photosites.

9. The apparatus of claim 8, wherein the unequal weighting includes an unequal weighting of the output voltages.

10. The apparatus of claim 9, wherein respective weights for determining the unequally-weighted average correspond to values attainable by linear interpolation.

11. The apparatus of claim 9, wherein the unequal weighting corresponds to values attainable by second order interpolation.

12. The apparatus of claim 9, wherein the unequal weighting corresponds to values attainable by $n^{th}$ order interpolation, wherein n is greater than two.

13. The apparatus of claim 1, wherein the column lines includes at least one column line for each photosite in the first row.

14. An apparatus comprising:
a plurality of column connect switches configured to selectively connect outputs of photosites of a first row of an image sensor to respective column lines;
a plurality of electrical storage elements selectively connectable to the column lines, wherein the electrical storage elements are configured to store output voltages of the photosites, wherein the electrical storage elements comprises capacitive elements, wherein each of the capacitive elements have about equal capacitances;
a plurality of sampling switches configured to selectively connect each of the plurality of electrical storage elements to at least one of the column lines; and
a plurality of mixing switches configured to selectively connect at least two of the column lines,
wherein the column connect switches, the sampling switches, and the mixing switches are controllable to:
store selected outputs of the photosites of the first row of the image sensor in the plurality of electrical storage elements; and
combine with unequal weighting an even number of the selected outputs of the photosites of the first row stored in the plurality of electrical storage elements to effectuate unequally-weighted average even-factor decimation in the analog domain, wherein the unequal weighting includes an unequal weighting of the output voltages.

15. The apparatus of claim 14, wherein the unequally-weighted average even-factor decimation produces an effective sampling location for a sub-array of the photosites, wherein the sub-array includes adjacent photosites of the same color and the same row or column of the image sensor, wherein the effective sampling location is at a distance from an average location of the photosites of the sub-array.

16. A method of even-factor decimation in the analog domain, the method comprising:
storing selected outputs of photosites of a first row of an image sensor on a plurality of electrical storage elements, wherein the outputs of the photosites include output voltages, wherein each of the plurality of electrical storage elements comprises capacitive elements of about the same capacitance; and
selectively combining with unequal weighting an even number of the outputs of the photosites of the first row stored on the plurality of electrical storage elements to generate one or more effective sampling locations by unequally-weighted average even-factor decimation in the analog domain, wherein the combining with unequal weighting includes determining an unequally-weighted average of a plurality of the output voltages.

17. The method of claim 16, further comprising selecting at least one row and at least two columns of outputs of the photosites of the image sensor.

18. The method of claim 16, further comprising:
selecting at least one column of the outputs of the photosites of the image sensor;
storing the selected outputs of the photosites of the column on the plurality of storage elements; and
combining with unequal weighting an even number of the outputs of the photosites of the column to effectuate even-factor decimation in the analog domain.

19. The method of claim 16, wherein storing the selected outputs comprises selectively sampling the outputs of the photosites from the image sensor including a color filter.

20. The method of claim 19, wherein the color filter is a Bayer filter.

21. The method of claim 19, wherein the color filter at least in part contributes to the generation of the outputs of the photosites that are interpretable by a demosaicing algorithm.

22. The method of claim 16, wherein storing the selected outputs includes reading the outputs from a plurality of column lines, wherein the plurality of column lines includes at least one column line for each photosite in the first row.

23. The method of claim 16, further comprising generating control signals to effectuate weighted-average even-factor decimation of the photosite outputs.

24. The method of claim 23, further comprising effectuating weighted-average 2×2 decimation by providing control signals to a combination of mixing switches to selectively interconnect the pluralities of electrical storage elements.

25. The method of claim 16, further comprising generating at least one column select signal and at least one row select signal.

26. A method of even-factor decimation in the analog domain, the method comprising:
storing selected outputs of photosites of a first row of an image sensor on a plurality of electrical storage elements; and
selectively combining with unequal weighting an even number of the outputs of the photosites of the first row stored on the plurality of electrical storage elements to generate one or more effective sampling locations by unequally-weighted average even-factor decimation in the analog domain, wherein the weighted-average even-factor decimation produces effective sampling locations for a sub-array of photosites of the image sensor, wherein the sub-array includes adjacent photosites of the same color and the same row or column of the image sensor, wherein the effective sampling location is at a distance from an average location of the photosites of the sub-array.

27. The method of claim 26, wherein the outputs of the photosites include output voltages.

28. The method of claim 27, wherein the combining with unequal weighting includes determining an unequally-weighted average of a plurality of the output voltages.

29. The method of claim 28, wherein respective weights for determining the unequally-weighted average correspond to values attainable by linear interpolation.

30. The method of claim 28, wherein the unequal weighting corresponds to values attainable by second order interpolation.

31. The method of claim 28, wherein respective weights for determining the unequally-weighted average correspond to values attainable by $n^{th}$ order interpolation, wherein n is greater than two.

32. The method of claim 28, wherein each of the plurality of electrical storage elements comprises capacitive elements of about the same capacitance.

* * * * *